US009588530B2

(12) United States Patent
Pujol et al.

(10) Patent No.: US 9,588,530 B2
(45) Date of Patent: Mar. 7, 2017

(54) VOLTAGE REGULATOR CIRCUIT AND METHOD THEREFOR (75) Inventors: Alexandre Pujol, Ste Foy d'Aigrefeuille (FR); Valerie Bernon-Enjalbert, Fonsorbes (FR); Mohammed Mansri, Toulouse (FR)

(73) Assignee: NXP USA, Inc., Austin, TX (US)

( * ) Notice: Subject to any disclaimer, the term of this patent is extended or adjusted under 35 U.S.C. 154(b) by 55 days.

(21) Appl. No.: 14/406,968

(22) PCT Filed: Jul. 6, 2012

(86) PCT No.: PCT/IB2012/001563
§ 371 (c)(1),
(2), (4) Date: Dec. 10, 2014

(87) PCT Pub. No.: WO2014/006440
PCT Pub. Date: Jan. 9, 2014

(65) Prior Publication Data
US 2015/0160668 A1    Jun. 11, 2015

(51) Int. Cl.
*H02M 3/158* (2006.01)
*G05F 1/575* (2006.01)
(Continued)

(52) U.S. Cl.
CPC .............. *G05F 1/575* (2013.01); *G05F 1/565* (2013.01); *H02M 3/1582* (2013.01); *H02M 2001/0045* (2013.01)

(58) Field of Classification Search
CPC ... H02M 3/156; H02M 3/1582; H02M 3/1584
(Continued)

(56) References Cited

U.S. PATENT DOCUMENTS 6,152,798 A     11/2000  Raburn
2003/0234635 A1  12/2003  Currelly et al.
(Continued)

FOREIGN PATENT DOCUMENTS

EP      1681760 A2     7/2006
WO   2005/055405 A1    6/2005
WO   2008/010062 A1    1/2008

OTHER PUBLICATIONS

International Search Report and Written Opinion correlating to PCT/IB2012/001563 dated Jun. 11, 2013.

*Primary Examiner* — Jeffrey Sterrett (57) ABSTRACT

A voltage regulator circuit arranged to receive a voltage supply signal, and to output a regulated voltage signal is described. The voltage regulator circuit comprises at least one switched mode power supply component selectively configurable to perform regulation of the voltage supply signal, at least one linear voltage regulator component selectively configurable to perform regulation of the voltage supply signal, and at least one controller component. The at least one controller component is arranged to receive an indication of a voltage level of the voltage supply signal, and configure a bulk connection for at least one switching device of the at least one linear voltage regulator component such that current flow from an output of the voltage regulator circuit to an input of the voltage regulator circuit through the bulk of the at least one switching device of the at least one linear voltage regulator component is resisted, if the indicated voltage level of the voltage supply signal is less than the threshold voltage level.

18 Claims, 4 Drawing Sheets

(51) Int. Cl.
  *G05F 1/565*   (2006.01)
  *H02M 1/00*   (2006.01)
(58) Field of Classification Search
  USPC .......................... 323/268, 273, 274, 282, 284
  See application file for complete search history.

(56) References Cited

U.S. PATENT DOCUMENTS

| | | | |
|---|---|---|---|
| 2007/0057655 A1* | 3/2007 | Nishida ................. | H01M 10/44 |
| | | | 323/282 |
| 2010/0026263 A1 | 2/2010 | Moussaoui et al. | |
| 2011/0062921 A1 | 3/2011 | Sudou | |
| 2015/0160668 A1* | 6/2015 | Pujol ....................... | G05F 1/565 |
| | | | 323/280 |

* cited by examiner

VOLTAGE REGULATOR CIRCUIT AND METHOD THEREFOR

FIELD OF THE INVENTION

The field of this invention relates to a voltage regulator circuit and method therefor.

BACKGROUND OF THE INVENTION

Power supply circuits within modern integrated circuit (IC) devices are often required to generate a constant, stable output voltage from a varying input voltage. For example, in automotive applications a power supply circuit may be required to generate a regulated 7V output voltage from an input voltage from a battery comprising a voltage level ranging from, say, a nominal battery voltage of 14V down to 2.5V during a 'cranking' pulse. The term 'cranking pulse' in this context describes a high voltage drop that may occur with a discharged battery when a driver attempts to start up a vehicle. Initially, the battery voltage may operate with its normal value, for example around 14V. When the driver attempts to start the vehicle, the battery voltage may drop to a low value (e.g. down to as low as, say, 2.5V) within a short time interval before it returns to its normal level. However, it is very important to keep any supply voltage provided to automotive electronics connected to the battery at a certain stable voltage level to avoid damage to the electronics and avoid unpredictable data processing.

In order to be able to regulate such a range of input voltage levels, it is known to use a switched mode power supply (SMPS), for example such as a Buck-Boost converter. SMPS's are capable of converting a varying input voltage to a higher or lower regulated output voltage. The switching action of the SMPS converts the substantially continuous input voltage into a pulsed signal comprising a substantially square waveform, which is then filtered to remove the high frequency components and create a regulated continuous output voltage signal. The basic elements of an SMPS typically comprise power switch devices, an inductor and capacitor for energy storage and filtering, and a feedback/control circuit to modulate the switch timing to regulate the output voltage. Advantageously, the power switch device(s) of an SMPS typically continuously switch between fully on and fully off. As such, they spend very little time in the high-dissipation transition region of operation. Accordingly, SMPS's enable efficient voltage regulation as compared with, for example, a linear voltage regulator, in particular for large differential input/output voltages.

During a quiescent (low power) mode of operation, whereby the voltage regulator circuit is not required to drive a load current (but is required to maintain the output voltage level), the efficiency of the voltage regulator circuit is determined by the quiescent current thereof. Because of their switching nature, SMPS's comprise a relatively high quiescent current, in particular within their control circuitry. In contrast, a linear regulator, such as a low dropout (LDO) regulator, comprises a significantly smaller quiescent current. Accordingly, during such a quiescent mode, it is desirable to turn the SMPS off, and use a linear regulator, such as a low dropout (LDO) regulator, to generate the required (quiescent) output voltage signal. An LDO regulator typically comprises a MOSFET (metal oxide field effect transistor) controlled by, for example, a differential amplifier (error amplifier).

Figure 1:
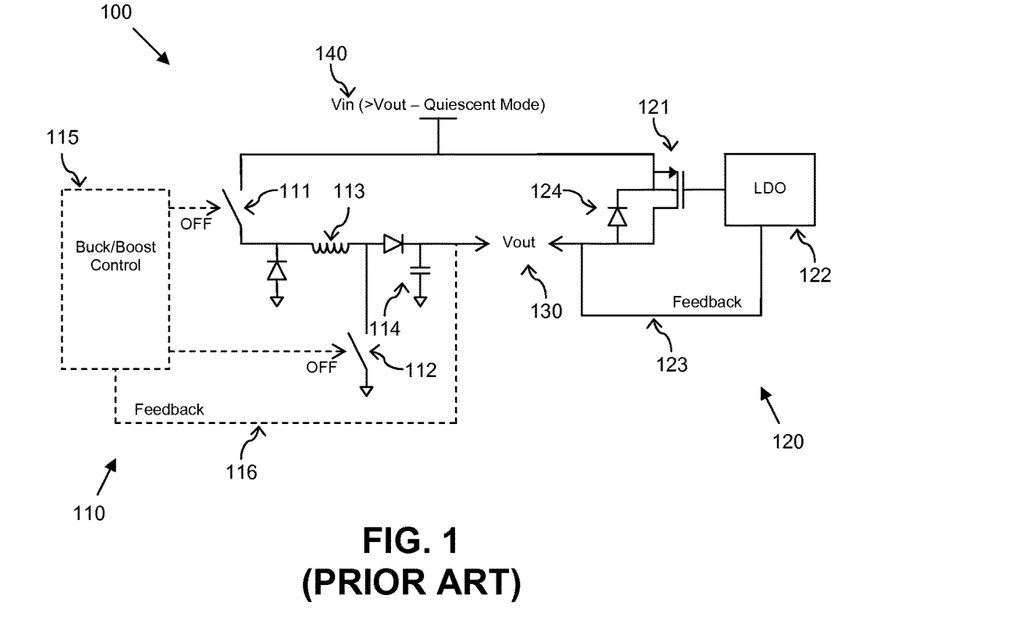
FIGS. 1 and 2 illustrate a simplified circuit diagram of an example of a known voltage regulator circuit.
Figure 2:
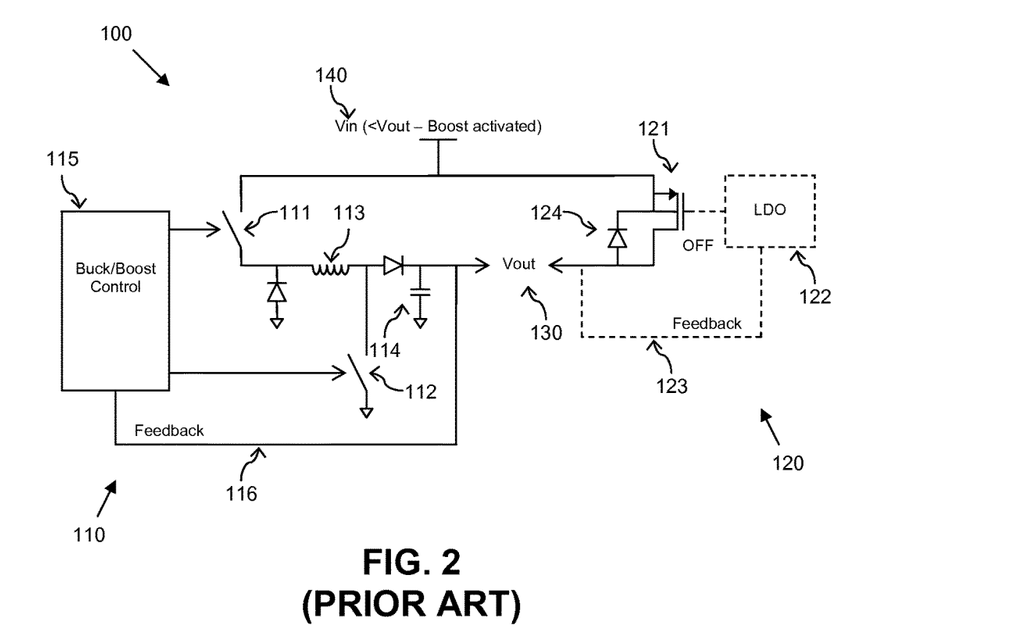

FIGS. 1 and 2 illustrate a simplified circuit diagram of an example of a known voltage regulator circuit 100 comprising an SMPS component 110 and LDO regulator component 120 operably coupled in parallel, and arranged to generate a constant, stable output voltage 130 from a varying input voltage 140. The SMPS component 110 comprises power switch devices 111, 112, an inductor 113 and capacitor 114 for energy storage and filtering, a control module 115 arranged to receive a feedback signal 116 and to modulate the switch timing of the power switches 111, 112 to regulate the output voltage 130. The LDO regulator component 120 comprises a MOSFET 121 and a control component 122, for example comprising a differential amplifier (not shown), arranged to receive a feedback signal 123 and to modulate the conductivity of the MOSFET 121 to regulate output voltage 130.

In particular, FIG. 1 illustrates the voltage regulator circuit 100 during a quiescent mode of operation. As such, in this quiescent mode the SMPS component 110 is disabled, whilst voltage regulation is performed by the LDO regulator component 120. A limitation of a linear regulator such as the LDO regulator component 120 is that it is limited to outputting a maximum voltage level up to that of the input voltage 140 (less the saturation voltage of the MOSFET 121). Accordingly, if the input voltage 140 drops below the required/intended output voltage level, for example during a cranking pulse, it is necessary to revert to the SMPS component 110 to step-up the input voltage 140 to the required and/or intended output voltage level, as illustrated in FIG. 2. As a result, the LDO regulator component 120 will become disabled, whilst the SMPS component 110 is activated in boost mode to perform the required step-up voltage regulation.

A problem with the known voltage regulator circuit 100 illustrated in FIGS. 1 and 2 is that the MOSFET 121 comprises a parasitic PNP transistor structure. Under certain conditions (under high drain current, when the on-state drain to source voltage is in the order of some volts), this parasitic PNP transistor would be triggered, making the MOSFET 121 uncontrollable. It is therefore necessary to short the base (the bulk of the MOSFET) of the parasitic transistor to its emitter (the source of the MOSFET) to prevent spurious latching. This shorting however creates a p-n junction diode 124 between the drain (anode) and the source (cathode) of the MOSFET 121, making it able to block current in only one direction. Specifically, this diode 124 within the MOSFET 121 allows current to flow from the output 130 of the voltage regulator circuit 100 to the input of the voltage regulator circuit. Accordingly, if the input voltage 140 drops below the require output voltage level, and the voltage regulator circuit 100 reverts to the SMPS component 110 to boost the input voltage to the required/intended output voltage, the diode 124 provides a current path from the output 130 of the voltage regulator circuit 100 to the input, effectively tying the output voltage 130 to the input voltage 140 under such low input voltage conditions.

SUMMARY OF THE INVENTION

The present invention provides a voltage regulator circuit and a method of regulating a voltage supply signal as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to an example of a voltage regulator circuit comprising a switched mode power supply (SMPS) component and a linear voltage regulator component operably coupled in parallel. It will be appreciated that the present invention is not limited to the specific example described herein with reference to the accompanying drawings. For example, in the illustrated example, the voltage regulator circuit comprises an SMPS component in the form of a buck-boost converter and a linear voltage regulator component in the form of a low dropout (LDO) regulator. However, the present invention is not limited to a voltage regulator circuit comprising a buck-boost converter and an LDO regulator, and may equally be applied to voltage regulator circuits comprising alternative SMPS and linear voltage regulator components. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 3:
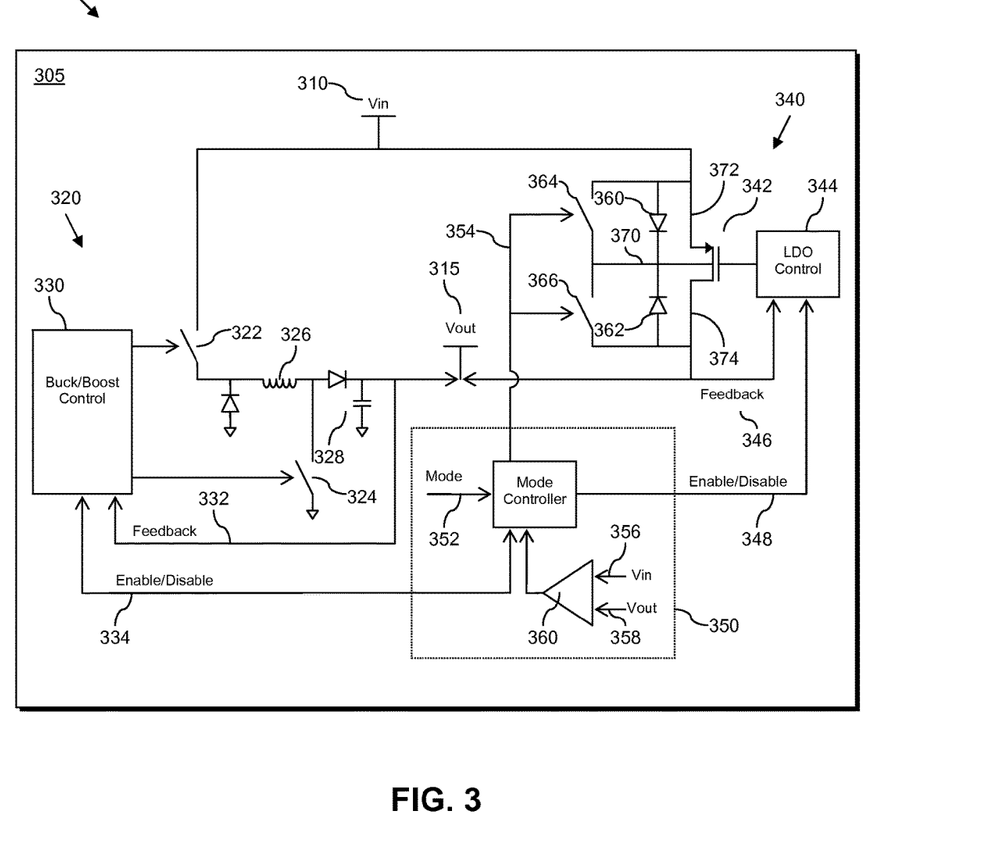
FIGS. 3 to 5 illustrate a simplified circuit diagram of an example of a voltage regulator circuit.

Referring first to FIG. 3, there is illustrated a simplified circuit diagram of an example of a voltage regulator circuit 300 arranged to receive a voltage supply signal ($V_{in}$) 310, and to output a regulated voltage signal ($V_{out}$) 315. In the illustrated example, the voltage regulator circuit 300 is implemented within an integrated circuit device 305 comprising at least one die within a single integrated circuit package, and comprises an SMPS component 320 selectively configurable to perform regulation of the voltage supply signal ($V_{in}$) 310. In the illustrated example, the SMPS component 320 is in the form of a buck-boost converter, and comprises switching devices 322, 324, an inductor 326 and capacitor 328 for energy storage and filtering, a control module 330 arranged to receive a feedback signal 332 and to modulate the switch timing of the switching devices 322, 324 to regulate the output voltage ($V_{out}$) 315.

The voltage regulator circuit 300 further comprises a linear voltage regulator component 340 operably coupled in parallel with the SMPS component 320, and also selectively configurable to perform regulation of the voltage supply signal ($V_{in}$) 310. In the illustrated example, the linear voltage regulator component 340 is in a form of an LDO regulator, and comprises a switching device 342 and a control component 344, for example comprising a differential amplifier (not shown), arranged to receive a feedback signal 346 and to modulate the conductivity of the switching device 342 to regulate the output voltage ($V_{out}$) 315.

The voltage regulator circuit 300 further comprises a controller component 350 arranged to selectively configure regulation of the voltage supply signal ($V_{in}$) 310 by one of the SMPS component 320 and the linear voltage regulator component 340. In the illustrated example, the controller component 350 is arranged to receive a mode control signal 352, and to configure one of the SMPS component 320 and the linear voltage regulator component 340 to perform regulation of the voltage supply signal ($V_{in}$) 310 based at least partly on the mode control signal 352. For example, upon receipt of a mode control signal 352 indicating that the voltage regulator circuit 300 is to be configured to operate in an 'active' operating mode whereby the voltage regulator circuit 300 is required to drive a load current, the controller component 350 may be arranged to enable, via enable/disable signal 334, the SMPS component 320 to perform regulation of the voltage supply signal ($V_{in}$) 310, whilst disabling the linear voltage regulator component 340, via enable/disable signal 348. In this manner, during such an active operating mode, the SMPS component 320 may be configured to perform regulation of the voltage supply signal ($V_{in}$) 310 during such an active operating mode. Advantageously, SMPS's are capable of converting a varying input voltage to a higher or lower regulated output voltage. Furthermore, the switching devices of an SMPS typically continuously switch between fully on and fully off. As such, they spend very little time in the high-dissipation transition region of operation. Accordingly, the SMPS component 320 enables efficient voltage regulation during such an active operating mode as compared with, for example, the linear voltage regulator component 340, in particular for large differential input/output voltages.

Conversely, if the voltage regulator circuit 300 is required to operate in a 'quiescent' operating mode, whereby the voltage regulator circuit 300 is not required to drive a load current (but is required to maintain an output voltage level), for example, upon receipt of a mode control signal 352 indicating that the voltage regulator circuit 300 is to be configured to operate in such a quiescent operating mode, the control component 350 may be arranged to enable the linear voltage regulator component 340 via enable/disable signal 348, whilst disabling the SMPS component 320 via enable/disable signal 334. Advantageously, a linear regulator, such as a low dropout (LDO) regulator, comprises a significantly smaller quiescent current than an SMPS.

In the illustrated example, the switching device 342 of the linear voltage regulator component 340 comprises a metal oxide semiconductor field effect transistor (MOSFET), and in particular a p-channel MOSFET. As is known, such a switching device 342 comprises a parasitic PNP transistor structure. This parasitic transistor structure has been illustrated by way of two p-n junction diodes 360, 362 in the illustrated example. In order to prevent spurious latching of the switching device 342, it is known to short the base of the parasitic transistor to its emitter. For example, when the linear voltage regulator component 340 is configured to perform regulation of the voltage supply signal ($V_{in}$) 310, such shorting of the base of the parasitic transistor to its emitter may be achieved by way of a bulk connection between a bulk terminal 370 of the switching device 342 and a source terminal 372 of the switching device 342.

In the illustrated example, the voltage regulator circuit 300 comprises a switch element 364 operably coupled between the source terminal 372 of the switching device 342 of the linear voltage regulator component 340 and the bulk terminal 370 of the switching device 342 of the linear voltage regulator component 340. The controller component 350 is operably coupled to the switch element 364 via control signal 354, and arranged to selectively configure the switch element 364 between a closed state, to operably couple the source terminal 372 of the switching device 342 of the linear voltage regulator component 340 to the bulk terminal 370 thereof, and an open state. In this manner, the controller component 350 may be arranged to configure such a bulk connection between the source terminal 372 and the bulk terminal 370 of the switching device 342 when the voltage regulator circuit 300 is required to operate in a quiescent operating mode.

Figure 4:
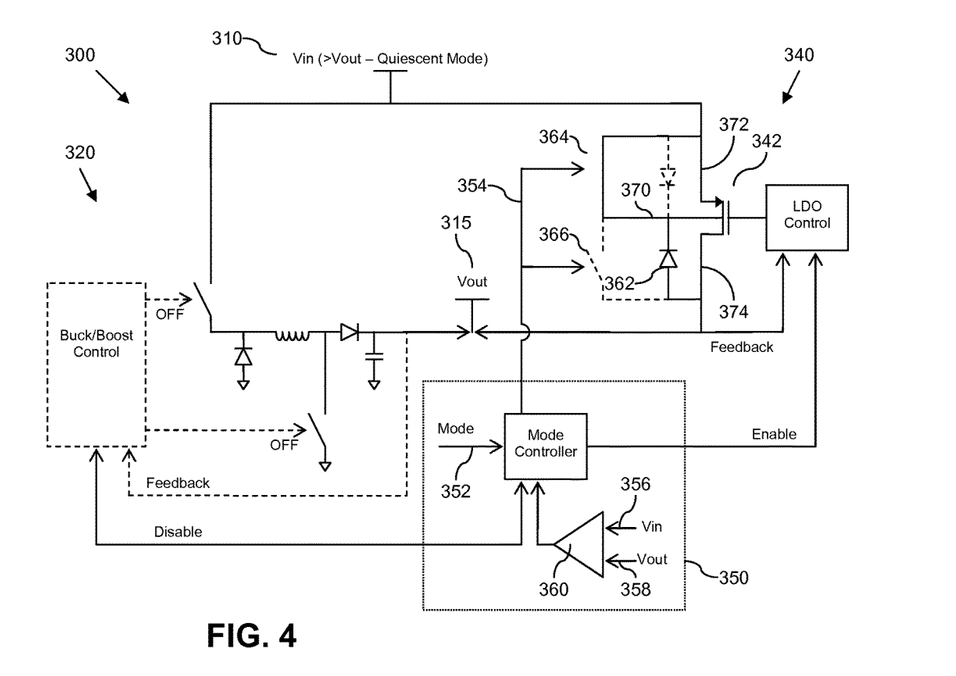

FIG. 4 illustrates an example of the voltage regulator circuit 300 when configured to operate in such a quiescent operating mode whilst the input voltage supply signal (Vin) 310 is greater than a required/intended output voltage level. In this quiescent mode configuration of the voltage regulator circuit 300, the SMPS component 320 has been disabled by the controller component 350, whilst the linear voltage regulator component 340 has been enabled by the controller component 350. In this manner, the linear voltage regulator component 340 has been configured to perform the regulation of the voltage supply signal (Vin) 310. Furthermore, the controller component 350 has configured the switching element 364 to comprise a closed state in order to configure a bulk connection between the source terminal 372 and the bulk terminal 370 of the switching device 342 of the linear voltage regulator component 340. Accordingly, the base of the parasitic PNP transistor within the switching device 342 is shorted to the emitter thereof, preventing spurious latching of the switching device 342, with the diode structure 362 between the bulk and drain terminals 370, 374 of the switching device 342 preventing current flow through the bulk of the switching device 342, enabling the switching device 342 to regulate the voltage there across, and thus to regulate the output voltage (Vout) 315.

Linear voltage regulators, such as the linear voltage regulator component 340 in the illustrated example, are unable to output regulated voltage signals comprising a voltage greater than their input voltage supply signal. Accordingly, if the input voltage supply signal ($V_{in}$) 310 should drop below a required/intended output voltage level, for example as a result of a cranking pulse from a load, the linear voltage regulator component 340 would be unable to maintain the required/intended output voltage. Accordingly, it would be necessary to switch to the SMPS component 320 to perform regulation of the voltage supply signal ($V_{in}$) 310 under such conditions in order to maintain the required/intended output voltage. To this end, the controller component 350 is arranged, at least during a quiescent operating mode, to receive an indication 356 of a voltage level of the voltage supply signal ($V_{in}$) 310, to detect when the voltage level of the voltage supply signal ($V_{in}$) 310 drops below a threshold voltage level, and if the voltage supply signal ($V_{in}$) 310 drops below the threshold voltage level during the quiescent operating mode to configure the SMPS component 320 to perform regulation of the voltage supply signal ($V_{in}$) 310. In the illustrated example, the controller component 350 comprises a comparator component 360 arranged to receive the indication 356 of the voltage level of the voltage supply signal ($V_{in}$) 310 and a threshold voltage, which in the illustrated example comprises a required/intended output voltage level indication 358, to compare the received indications 356, 358 of the voltage level of the voltage supply signal ($V_{in}$) 310 and a required/intended output voltage level, and to output an indication 362 of the result of the comparison. The controller component 350 may thus detect when the voltage level of the voltage supply signal ($V_{in}$) 310 drops below the threshold voltage level (e.g. the required/intended output voltage level) based on the indication 362 output by the comparator component 360.

As such, the controller component 350 may be arranged to selectively configure the linear voltage regulator component 340 to perform regulation of the voltage supply signal ($V_{in}$) 310 during a quiescent operating mode of the voltage regulator circuit 300 whilst the indicated voltage level 356 of the voltage supply signal ($V_{in}$) 310 is greater than the required/intended output voltage level indication 358. Conversely, the controller component 350 may be arranged to selectively configure the SMPS component 320 to perform regulation of the voltage supply signal ($V_{in}$) 310 during a quiescent operating mode of the voltage regulator circuit 300 if the indicated voltage level 356 of the voltage supply signal ($V_{in}$) 310 is less than the required/intended output voltage level indication 358.

Referring back to FIG. 4, when the linear voltage regulator component 340 is configured to perform the regulation of the input voltage supply signal ($V_{in}$) 310 during a quiescent mode (when the input voltage supply signal ($V_{in}$) 310 comprises a voltage level greater than the required/intended output voltage level), the switching element 364 is configured by the controller component 350 to comprise a closed state in order to configure a bulk connection between the source terminal 372 and the bulk terminal 370 of the switching device 342 of the linear voltage regulator component 340. However, as can be seen in FIG. 4, such a bulk connection configuration means that if the input voltage supply signal ($V_{in}$) 310 drops below the required/intended output voltage level, even if the controller component 350 configures the SMPS component 320 to perform the regulation of the input voltage supply signal ($V_{in}$) 310, current is able to freely flow from an output of the voltage regulator circuit 300, through the diode structure 362 and the bulk connection provided by the switch element 364 when closed, to an input of the voltage regulator circuit 300, substantially preventing the output voltage signal 315 from being regulated to a higher voltage level than the input voltage supply signal ($V_{in}$) 310 whilst the switch element 364 is configured to comprise such a closed state.

Accordingly, in some example, the controller component 350 is further arranged to configure a bulk connection for the switching device 342 of the linear voltage regulator component 340 such that current flow from the output of the voltage regulator circuit 300 to the input of the voltage regulator circuit 300 through the bulk 370 of the switching device 342 of the linear voltage regulator component 340 is resisted, if the indicated voltage level 356 of the input voltage supply signal ($V_{in}$) 310 is less than the threshold voltage level 358.

In particular, in the illustrated example, the voltage regulator circuit 300 further comprises a switch element 366 operably coupled between the drain terminal 374 of the switching device 342 of the linear voltage regulator 340 and the bulk terminal 370 of the switching device 342 of the linear voltage regulator component 340. The controller component 350 is operably coupled to the switch element 364 via, in the illustrated example, control signal 354, and arranged to selectively configure the switch element 364 between a closed state, to operably coupled the drain terminal 374 of the switching device 342 of the linear voltage regulator component 340 to the bulk terminal 370 thereof, and an open state. In this manner, the controller component 350 may be arranged to configure a bulk connection between the drain terminal 374 and the bulk terminal 370 of the switching device 342.

For example, when the controller component 350 configures the linear voltage regulator component 340 to perform regulation of the voltage supply signal ($V_{in}$) 310 during a quiescent operating mode of the voltage regulator circuit 300 whilst the indicated voltage level 356 of the voltage supply signal ($V_{in}$) 310 is greater than the required/intended output voltage level indication 358, the controller component 350 may also configure the switch element 364 to comprise a closed state and the switch element 366 to comprise an open state, as illustrated in FIG. 4. In this manner, the controller component 350 is able to configure a bulk connection between the source terminal 372 and the bulk terminal 370 of the switching device when the indicated voltage level 356 of the voltage supply signal ($V_{in}$) 310 is greater than the required/intended output voltage level indication 358, and the linear voltage regulator component 340 is configured to perform regulation of the voltage supply signal ($V_{in}$) 310 during a quiescent operating mode of the voltage regulator circuit 300.

Figure 5:
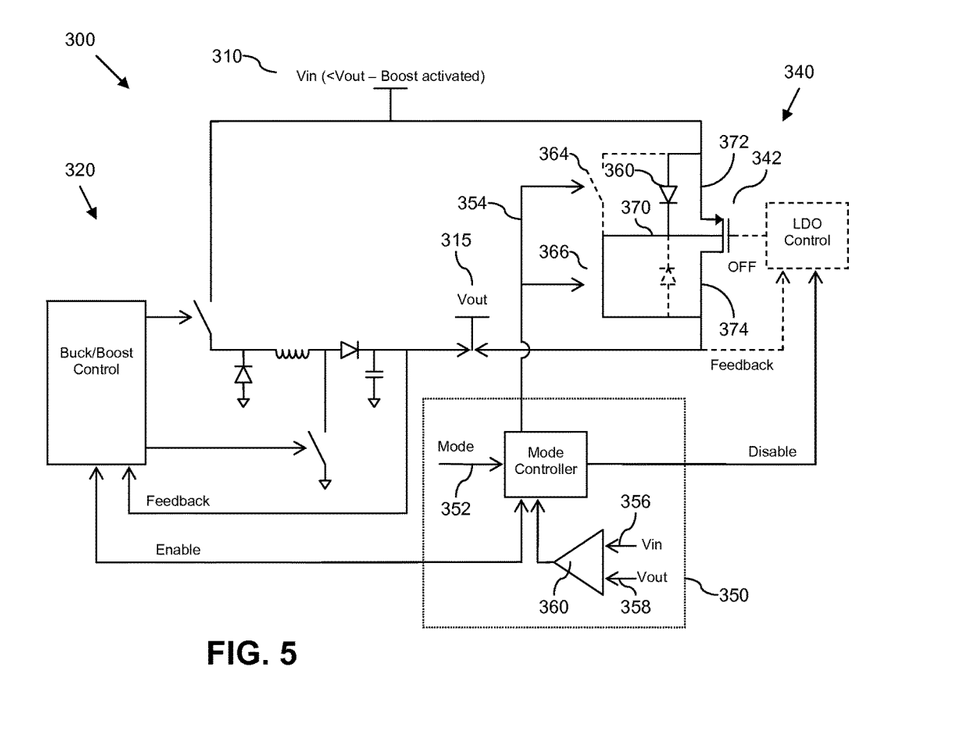

Conversely, and as illustrated in FIG. 5, upon detection that the voltage level of the voltage supply signal ($V_{in}$) 310 has dropped below the threshold voltage level (e.g. the required/intended output voltage level) based on the indication 362 output by the comparator component 360, the controller component may configure the SMPS component 320 to perform regulation of the voltage supply signal ($V_{in}$) 310 during a quiescent operating mode of the voltage regulator circuit 300. The controller component 350 may also reconfigure the switch element 364 to comprise an open state and the switch element 366 to comprise a closed state. In this manner, the controller component 350 is able to configure a bulk connection between the drain terminal 374 and the bulk terminal 370 of the switching device 342 when the indicated voltage level 356 of the voltage supply signal ($V_{in}$) 310 is less than the required/intended output voltage level indication 358, and the linear voltage regulator component 340 is configured to perform regulation of the voltage supply signal ($V_{in}$) 310 during a quiescent operating mode of the voltage regulator circuit 300.

In this manner, and as can be seen in FIG. 5, such a bulk connection between the drain terminal 374 and the bulk terminal 370 of the switching device 342 means that when the input voltage supply signal ($V_{in}$) 310 drops below the required/intended output voltage level, current is prevented from flowing from an output of the voltage regulator circuit 300 to an input of the voltage regulator circuit 300 by the diode structure 360. Thus, the SMPS component 320 is able to regulate the output voltage signal 315 to a higher voltage level than the input voltage supply signal ($V_{in}$) 310.

Figure 6:
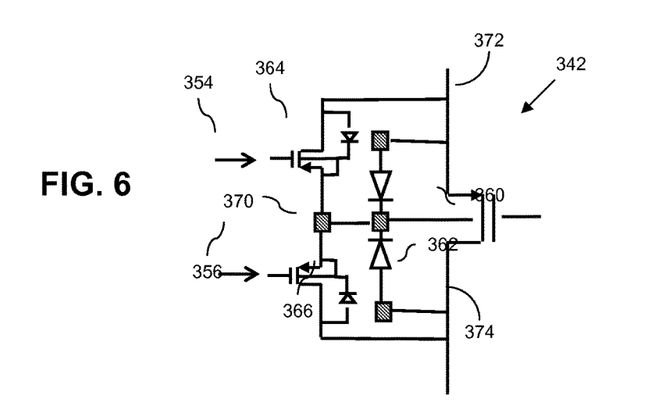
FIG. 6 illustrates a simplified circuit diagram of an example of a bulk connection arrangement for a switching device of a linear voltage regulator component.

The switch elements 364, 366 may be implemented using any suitable components. For example, and as illustrated in FIG. 6, the switch elements 364, 366 may be implemented using p-channel MOSFET transistors (PMOSs), in which a body/drain diode of each of the PMOS switch elements 364, 366 is configured in parallel with the respective bulk pass diode 360, 362 of the switching device 340.

In the illustrated example, a single control signal 354 for controlling the switching elements 364, 366 has been illustrated for simplicity. However, it will be appreciated that separate control signals (one for each switching element 354, 356) may equally be implemented.

Figure 7:
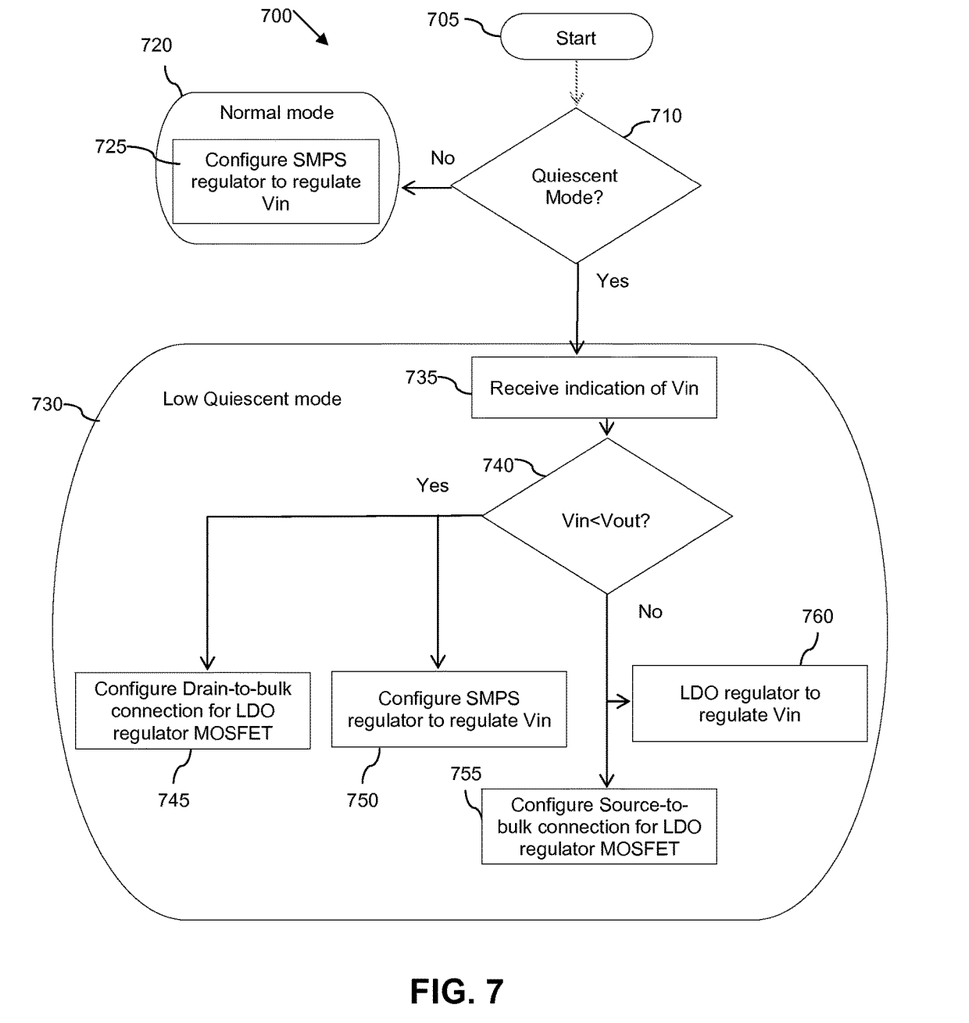
FIG. 7 illustrates a simplified flowchart of an example of a method of regulating a voltage supply signal.

Referring now to FIG. 7, there is illustrated a simplified flowchart 700 of an example of a method of regulating a voltage supply signal within a voltage regulator circuit, for example such as may be implemented within the voltage regulator circuit 300 of FIGS. 3 to 5. The method starts at 705, and moves on to 710, where it is determined whether the voltage regulator circuit is operating in a quiescent operating mode. If it is determined that the voltage regulator circuit is not configured to operate in a quiescent operating mode, the method moves on to 720 where, in the illustrated example, the method moves to a normal operating mode state 720, in which an SMPS component of the voltage regulator circuit is configured in 725 to perform the regulation of the input voltage supply signal for the voltage regulator circuit.

Conversely, if it is determined that the voltage regulator circuit is configured to operate in a quiescent operating mode, the method moves on to a quiescent operating mode state 730. In this quiescent operating mode state 730 of the illustrated example, the method comprises receiving an indication of a voltage level of the voltage supply signal to be regulated, at 735. Next, at 740, it is determined whether the indicated voltage level of the voltage supply signal to be regulated is less than a threshold voltage level, and in particular in the illustrated example is less than an intended output voltage level for the voltage regulator circuit. If the indicated voltage level of the voltage supply signal is less than the threshold voltage level, the method moves to 745 where a drain-to-bulk connection for a switching element of a linear voltage regulator component of the voltage regulator circuit is configured. In this manner, spurious latching of the switching element may be prevented whilst current flow from an output of the voltage regulator circuit to an input of the voltage regulator circuit through the bulk of the switching device of the linear voltage regulator component is resisted. Furthermore, an SMPS component of the voltage regulator circuit is configured to perform the regulation of the input voltage supply signal at 750.

Referring back to 740, if the indicated voltage level of the voltage supply signal is greater than the threshold voltage level, the method moves to 755 where a source-to-bulk connection for the switching element of the linear voltage regulator component of the voltage regulator circuit is configured. In this manner, spurious latching of the switching element may be preventing whilst current from the input of the voltage regulator circuit to the output of the voltage regulator circuit through the bulk of the switching device of the linear voltage regulator component is resisted. Furthermore, the linear voltage regulator component is configured to perform the regulation of the input voltage supply signal, at 760.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated example, discrete control modules 330, 344, have been illustrated for the SMPS and linear voltage regulator components, as well as for the controller component 350. However, it will be appreciated that some functionality may be shared between the various components.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A voltage regulator circuit arranged to receive a voltage supply signal, and to output a regulated voltage signal; the voltage regulator circuit comprising:
   a switched mode power supply component selectively configurable to perform regulation of the voltage supply signal;
   a linear voltage regulator component selectively configurable to perform regulation of the voltage supply signal, the linear voltage regulator comprising a switching device, and a diode coupled between a bulk connection of the switching device and an input of the voltage regulator;
   a controller component arranged to receive an indication of a voltage level of the voltage supply signal, to configure the bulk connection of the switching device, and to selectively configure the linear voltage regulator component to perform regulation of the voltage supply signal during a quiescent operating mode of the voltage regulator circuit, if the indicated voltage level of the voltage supply signal is greater than the threshold voltage level, wherein while the quiescent operating mode the linear voltage regulator component to maintain an particular output voltage level without a load current being driven by the linear voltage regulator component,
   the diode to cause a current flow from an output of the voltage regulator circuit to the input of the voltage regulator circuit through the bulk connection of the switching device to be resisted, if the indicated voltage level of the voltage supply signal is less than a threshold voltage level.

2. The voltage regulator circuit of claim 1 when implemented within an integrated circuit device comprising a die within a single integrated circuit package.

3. The voltage regulator circuit of claim 1, wherein the controller component is arranged to selectively configure the switched mode power supply component to perform regulation of the voltage supply signal, if the indicated voltage level of the voltage supply signal is less than the threshold voltage level.

4. The voltage regulator circuit of claim 1, wherein the voltage regulator circuit further comprises:
- a first switch element operably coupled between a drain terminal of the switching device of the linear voltage regulator component and a bulk terminal of the switching device of the linear voltage regulator component; and
- a second switch element operably coupled between a source terminal of the switching device of the linear voltage regulator component and the bulk terminal of the switching device of the linear voltage regulator component.

5. The voltage regulator circuit of claim 4, wherein the controller component is arranged to, if the indicated voltage level of the voltage supply signal is less than the threshold voltage level:
- configure the first switch element into a closed state to operably couple the drain terminal of the switching device of the linear voltage regulator component to the bulk terminal thereof; and
- configure the second switch element into an open state.

6. The voltage regulator circuit of claim 1, wherein the controller component is arranged to, if the indicated voltage level of the voltage supply signal is greater than the threshold voltage level during a quiescent operating mode of the voltage regulator circuit:
- configure the first switch element into an open state; and
- configure the second switch element into a closed state to operably couple the source terminal of the switching device of the linear voltage regulator component to the bulk terminal thereof.

7. The voltage regulator circuit of claim 1, wherein the threshold voltage level comprises an intended output voltage level for the voltage regulator circuit.

8. The voltage regulator circuit of claim 1, wherein the switching device of the linear voltage regulator component comprises a metal oxide semiconductor field effect transistor.

9. The voltage regulator circuit of claim 1, wherein the linear voltage regulator component comprises a low dropout regulator.

10. The voltage regulator circuit of claim 1, wherein the switched mode power supply component comprises a buck-boost converter.

11. A method of regulating a voltage supply signal within a voltage regulator circuit comprising a switched mode power supply component selectively configurable to perform regulation of the voltage supply signal, and a linear voltage regulator component selectively configurable to perform regulation of the voltage supply signal; the method comprising:
- receiving an indication of a voltage level of the voltage supply signal to be regulated; and
- configuring a bulk connection for a switching device of the linear voltage regulator component such that current flow from an output of the voltage regulator circuit to an input of the voltage regulator circuit through the bulk of the switching device of the linear voltage regulator component is resisted via a diode, if the indicated voltage level of the voltage supply signal is less than a threshold voltage level, and
- selectively configuring the linear voltage regulator component to perform regulation of the voltage supply signal during a quiescent operating mode of the voltage regulator circuit, if the indicated voltage level of the voltage supply signal is greater than the threshold voltage level, wherein while the quiescent operating mode the linear voltage regulator component to maintain an particular output voltage level without a load current being driven by the voltage regulator circuit.

12. The method of claim 11, wherein the switching device of the linear voltage regulator component comprises a metal oxide semiconductor field effect transistor.

13. The method of claim 11, wherein the linear voltage regulator component comprises a low dropout regulator.

14. The method of claim 11, further comprising selectively configuring the switched mode power supply component to regulate the voltage supply signal, if the indicated voltage level of the voltage supply signal is less than the threshold voltage level.

15. The method of claim 11, wherein the voltage regulator circuit comprises:
- a first switch element operably coupled between a drain terminal of the switching device of the linear voltage regulator component and a bulk terminal of the switching device of the linear voltage regulator component; and
- a second switch element operably coupled between a source terminal of the switching device of the linear voltage regulator component and the bulk terminal of the switching device of the linear voltage regulator component.

16. The method of claim 15, further comprising, if the indicated voltage level of the voltage supply signal is less than the threshold voltage level,
- configuring the first switch element into a closed state to operably couple the drain terminal of the switching device of the linear voltage regulator component to the bulk terminal thereof; and
- configuring the second switch element into an open state.

17. The method of claim 15, further comprising, if the indicated voltage level of the voltage supply signal is greater than the threshold voltage level during a quiescent operating mode of the voltage regulator circuit,
- configuring the first switch element into an open state; and
- configuring the second switch element into a closed state to operably couple the source terminal of the switching device of the linear voltage regulator component to the bulk terminal thereof.

18. The method of claim 11, wherein the threshold voltage level comprises an intended output voltage level for the voltage regulator circuit.

* * * * *